Patented May 30, 1950

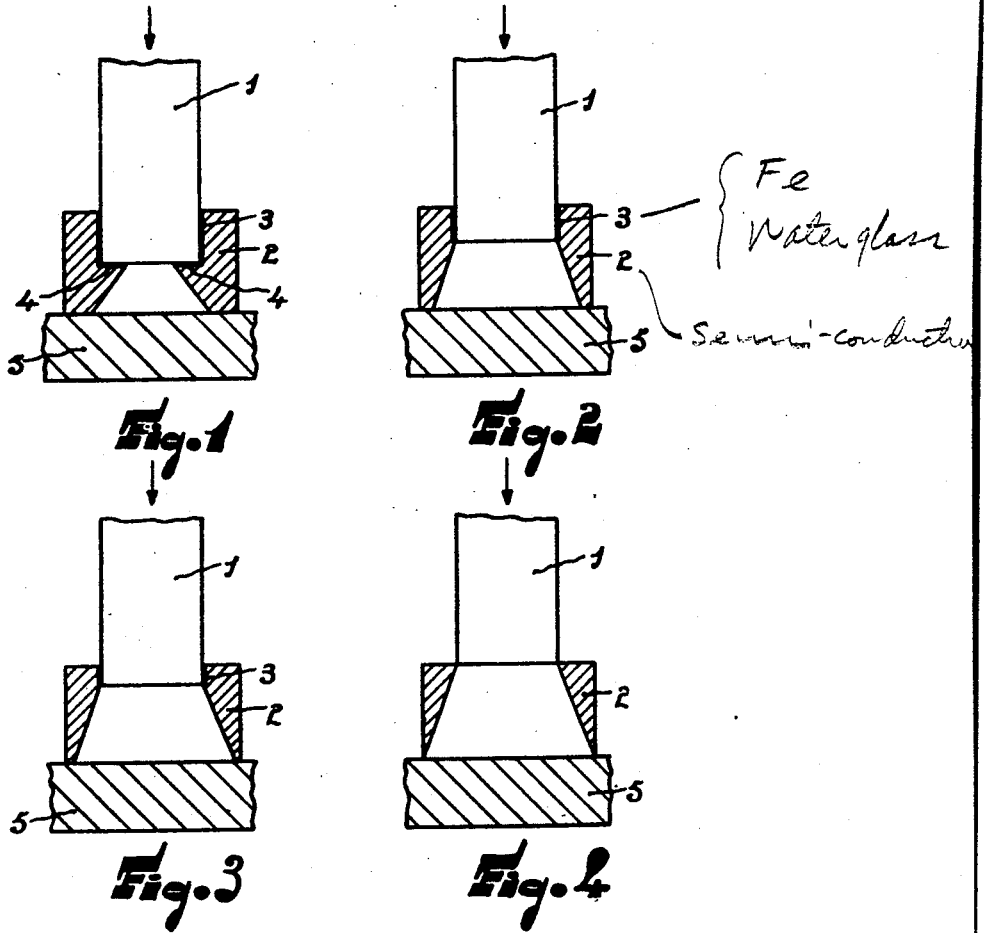

2,510,000

UNITED STATES PATENT OFFICE

2,510,000

METHOD AND ARTICLE FOR ELECTRIC ARC WELDING ONE METALLIC WORKPIECE TO ANOTHER

Paul Christiaan van der Willigen and Simon Dirk Boon, Eindhoven, Netherlands, assignors to Hartford National Bank and Trust Company, Hartford, Conn., as trustee Application March 9, 1948, Serial No. 13,915
In the Netherlands March 14, 1947

4 Claims. (Cl. 219—10)

This invention relates to a method for electric-arc welding in which use is not made of a bare welding wire or coated welding rod, but an arc is produced directly between the work-pieces to be secured together by employing a semi-conductive, slag-forming solid member which is sufficiently conductive for initiating the arc and establishes the electrical contact between the work-pieces which are required to be secured together and are slightly spaced apart. In such a method the welding arc is of very short duration and it is provided that one work piece, usually a rod shaped member e. g. a bolt, is placed on the other at the desired moment, which is ensured by a suitable choice of shape and size of the semi-conductive slag-forming solid member, so that a more or less intricate control device is not necessary. A semi-conductive slag-forming solid member of such a suitable device of shape and size in the form of a cap per se is described and claimed in applicants' copending application Serial No. 13,914 filed March 9, 1948, for an Article for electric arc-welding one metallic work-piece to another.

The conductivity required for the semi-conductive slag-forming solid body in regard to initiation of the welding arc is obtainable by mixing a large quantity of metal powder with constituents such as are used in slag-forming coating materials for welding rods.

According to the invention the semi-conductive slag-forming solid member is previously cemented to one of the work pieces to be welded together, by means of conductive cement which contains such a quantity of metal powder as is necessary for the said particular welding method.

As an example of such a cement we may mention a mixture of 70 parts by weight of iron powder and 30 parts by weight of water glass.

In practice the invention lends itself eminently for use with rod-shaped members, for instance bolts, of which the end that is to abut the other work-piece is furnished with the semi-conductive, slag-forming solid body in the form of a cap which is cemented to this end according to the invention. Thus it is possible for the industry to place on the market finished bolts obtained by mass-production for the said particular welding method.

To be complete it is pointed out that in the particular welding method to which the invention relates, a semi-conductive slag-forming solid body is preferred which does not give off any gases during the welding process so as to prevent the metal melted in situ during the short heating operation (½ to 2 seconds) from being blown away from the welding point with the consequent detrimental effect on the quality of the welded joint. As an example of such a semi-conductive slag-forming solid member we may mention a mixture of 15 parts by weight of calcium carbonate, 13 parts by weight of calcium fluoride, 12 parts by weight of bentonite, 2 parts by weight of ferro-manganese, 3 parts by weight of ferrosilicon, 2 parts by weight of ferro-titanium and 53 parts by weight of iron powder, which mixture is heated for one hour at 800° C. in a non-oxidising atmosphere. On using a mixture e. g. of 12 parts by weight calcium oxide, 13 parts by weight of calcium fluoride, 12 parts by weight of glass powder, 2 parts by weight of ferro-manganese, 3 parts by weight of ferro-silicon, 2 parts by weight of ferro-titanium and 50 parts by weight of iron powder such a preheating operation is not necessary.

In order that the invention may be clearly understood and readily carried into effect it will now be described more fully with reference to the accompanying drawing, given by way of example, which represents a metal rod 1 comprising a hollow cap 2 which consists of a semi-conductive, slag-forming mass which is cemented to the metal rod 1 by means of the layer of cement 3.

Such a cap is eminently suitable for using the aforesaid welding method, particularly when making use of the invention. In Figs. 1 to 4 the process is illustrated diagrammatically for a better understanding of the invention. Fig. 1 represents the starting position in which the bar 1 to be welded is pressed on the collar 4 in the cavity of the cap 2 resting on the metal work piece 5. Upon applying the voltage the semi-conductive material of the cap 2 passes current and an arc is struck between the metal rod 1 and the work piece 5. In the proximity of this arc melting occurs due to the high temperature so that we soon have the state shown in Figs. 2, 3 and 4 respectively. Fig. 4 illustrates the moment at which the metal bar under pressure, for instance spring pressure, is pressed on the work piece 5. In this event the quantity of molten metal is sufficient for establishing the welded joint between the rod 1 and the work piece 5.

The welding process is promoted by the cemented hollow cap 2, since the risk of premature depression of the rod 1 prior to melting of the collar 4 (Fig. 2) is avoided.

What we claim is:

1. A method of electric-arc welding one metallic work-piece to another metallic work-piece which comprises the steps of cementing to an inwardly projecting collar formed within an aperture extending completely through a semi-conductive slag-forming solid member, one of said work-pieces by means of conductive cement, placing said one of said work-pieces in operative relationship with said another work-piece so that said solid member abuts said another work-piece and acts as a spacer between both said work-pieces, constantly biasing said one of said work-pieces toward said another of said work-pieces, passing an electric current through said work-pieces and said semi-conductive element so that an arc is struck between said work-pieces and said one work-piece is finally moved to abutting relationship with said another work-piece after the heat of the arc has melted at least said collar in said slag-forming member, and then interrupting the electric current passing through said work-pieces.

2. A welding work-piece comprising a metallic rod-shaped member and a semi-conductive, slag-forming solid member having an inwardly projecting collar formed within an aperture extending completely through said solid member, said solid member being cemented to said metallic rod-shaped member at an end thereof by means of conductive cement with said rod-shaped member protruding into the aperture in said solid member and engaging said inwardly projecting collar, said solid member extending beyond the end of said rod-shaped member in the direction of the longer dimension thereof.

3. A welding work-piece as claimed in claim 2 wherein said semi-conductive, slag-forming solid member consists of material which is non-gas evolving under the intense heat of a welding operation for which said work-piece is adapted.

4. A method of electric arc-welding one metallic work-piece to another metallic work-piece, comprising the steps of placing a slag-forming semi-conductive solid body having a passageway of varying diameter completely therethrough on said one work-piece with one end of the passageway opening on said one work-piece and said another work-piece inserted into the other end of said passageway a distance limited therein by the dimensions of said passageway to so be spaced from said one work-piece, passing a current through said work-pieces to initiate an arc therebetween through said one end of the passageway, bringing the work-pieces into contact with one another after the current has passed through said work-pieces long enough to increase the diameter of said passageway in the region of the arc by melting of the solid body in the said region to permit such contact, and then discontinuing the current.

PAUL CHRISTIAAN VAN DER WILLIGEN.
SIMON DIRK BOON.

REFERENCES CITED

The following references are of record in the file of this patent:

UNITED STATES PATENTS

| Number | Name | Date |
| --- | --- | --- |
| Re. 22,108 | Crecca | June 9, 1942 |
| 2,043,960 | Jones et al. | June 9, 1936 |
| 2,057,670 | Crecca et al. | Oct. 20, 1936 |
| 2,326,865 | Kennedy | Aug. 17, 1943 |
| 2,370,100 | White | Feb. 20, 1945 |
| 2,384,403 | Somers | Sept. 4, 1945 |
| 2,429,175 | Van der Willigen et al. | Oct. 14, 1947 |
| 2,459,957 | Palmer | Jan. 25, 1949 |
| 2,474,531 | Keir et al. | June 28, 1949 |

FOREIGN PATENTS

| Number | Country | Date |
| --- | --- | --- |
| 497,133 | Great Britain | Dec. 13, 1938 |
| 365,302 | Italy | Nov. 30, 1938 |